US 6,636,507 B1

(12) United States Patent
Miyoshi et al.

(10) Patent No.: US 6,636,507 B1
(45) Date of Patent: Oct. 21, 2003

(54) FRAME DATA EXCHANGING METHOD AND APPARATUS

(75) Inventors: Yutaka Miyoshi, Kanagawa (JP); Junichi Hasegawa, Kanagawa (JP); Yoshiyuki Kunito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/520,274

(22) Filed: Mar. 7, 2000

(30) Foreign Application Priority Data

Mar. 8, 1999 (JP) .......................................... 11-060377

(51) Int. Cl.$^7$ .............................................. H04L 12/56
(52) U.S. Cl. .................................... 370/362; 370/395.1
(58) Field of Search ................................ 370/428, 413, 370/414, 395.1, 362, 363, 364, 365

(56) References Cited

U.S. PATENT DOCUMENTS 6,122,251 A * 9/2000 Shinohara .................... 370/231
6,449,283 B1 * 9/2002 Chao et al. .................. 370/461
6,563,837 B2 * 5/2003 Krishna et al. .............. 370/413

* cited by examiner

Primary Examiner—Kenneth Vanderpuye
(74) Attorney, Agent, or Firm—Jay H. Maioli

(57) ABSTRACT

A frame switching apparatus in which it is possible to suppress the operating frequency of the bus and to suppress the cell loss ratio in comparison with that of an ATM cell switching apparatus employing the conventional input buffer system. Since the small capacity buffer Bn-n furnishes a transient storage site for a cell C, a distribution circuit $3_n$ is able to receive a new cell $C_n$ from the input buffer $2_n$ to process the received cell. Therefore, head-of-line blocking is less likely to take place. On the other hand, since the small capacity buffer transfers the cell to only one output port, it is sufficient if the switching matrix SWM is of a N:1 multiplexer structure which is far simpler than a complete cross-bandwidth available register structure.

6 Claims, 21 Drawing Sheets

FRAME DATA EXCHANGING METHOD AND APPARATUS

BACKGROUND OF THE INVENTION

1. Field of the Invention

This invention relates to a frame data exchanging method and apparatus in which data is exchanged in terms of a pre-set number of frames as a unit.

2. Description of the Related Art

In communication application such as remote conferencing, large-scale distributed computing or data base, a high-speed network is required. Thus, high-speed communication by asynchronous transfer mode (ATM) has come to be used. This ATM is a technique of digitizing the information, such as speech, data or picture, splitting the information into information units of constant short lengths, switching at a high speed and transmitting the information to a counterpart side of the communication.

The current ATM switching mechanism employs roughly three systems, namely (1) an input buffer system, (2) an output buffer system and (3) a c-owned buffer system.

(1) In the input buffer system, a memory for transient storage of cells is provided in each input port. The memory is required to store the inputted cells reliably and operates at a speed higher than the information transmitting speed at the input port. The frame transfer occurs in accordance with the inputting sequence, that is in accordance with the first-in first-out (FIFO) system, so that, if the leading cell of the memory competes with other input ports as to acquisition of the output port, there is produced a head-of-line (HOL) blocking phenomenon in which succeeding cells cannot be transferred. The result is that the cells tend to be stagnant in the memory so that the cells tend to overflow from the memory to produce cell loss.

(2) The output buffer system provides a memory at each output port for transient cell storage. If the cell arrives at the input port, this cell needs to be instantly transferred to the memory of the output port. Therefore, the bus interconnecting the memories of the input and output ports needs to be operated at a speed not lower than the information transporting speed of the input port multiplied by the number of the input ports.

(3) The co-owned buffer system provides a sole buffer. The cells arriving at the totality of the input ports are immediately transferred and subsequently the cells stored in the buffer are read out by the output ports. Since the totality of the input ports and output ports communicate with the sole buffer, the bus interconnecting the buffer and the input and output ports needs to be operated at a speed not lower than the speed corresponding to a sum of the information transmission speed at the input port multiplied by the number of the input ports and the information transmission speed of the output port multiplied by the number of the output ports.

In the input buffer system (1), the bus operating speed is lower than that in the output buffer system (2) or in the co-owned buffer system (3), however, the frame loss ratio is higher than that in the output buffer system (2) or in the co-owned buffer system (3). In the output buffer system (2) or in the co-owned buffer system (3), the frame loss ratio is lower than that in the input buffer system (1), however, the bus operating speed is higher than that in the input buffer system (1).

For the above reason, it has been difficult in the conventional ATM switching mechanism to improve the cell switching speed to a value higher than a certain value as the cell loss ratio is suppressed to a lower value.

SUMMARY OF THE INVENTION

It is therefore an object of the present invention to provide a frame switching method and apparatus in which it is possible to suppress the bus operating frequency and to suppress the cell (frame) loss ratio to a value lower than that in the ATM switching mechanism employing the conventional input buffer system.

In one aspect, the present invention provides an apparatus for switching frame data in which data is switched in terms of a pre-set number of frames as a unit, including: input buffer means for storing frame data arriving at an input port from outside, distribution means for checking the addresses of the frame data stored in the input buffer means for associatively distributing the respective frame data to output ports, memory means connected to an downstream side of the distribution means in association with the output ports for temporarily storing the frame data distributed by the distribution means in association with the output ports, switching means for connecting the memory means to the output ports and arbitration means for controlling the switching means.

In another aspect, the present invention provides a method for switching frame data in which data is switched in terms of a pre-set number of frames as a unit, including a step of storing frame data arriving at an input port from outside in an input buffer, a step of checking the addresses of the frame data stored by the frame data storage step for associatively distributing the respective frame data to output ports, a step of temporarily storing the frame data distributed by the distribution step in association with the output ports, a step of arbitrating a switching portion between the memory and the output port in a controlled manner and a step of transferring the frame data stored in the storage step to the output port responsive to a use permission of the switching portion arbitrated by the arbitration step.

In accordance with the present invention, there may be provided a frame switching method and apparatus by means of which it is possible to suppress the operating frequency of the bus and to suppress the cell loss ratio in comparison with that in an ATM cell switching apparatus employing the conventional input buffer system.

DESCRIPTION OF THE PREFERRED EMBODIMENTS

Figure 1:
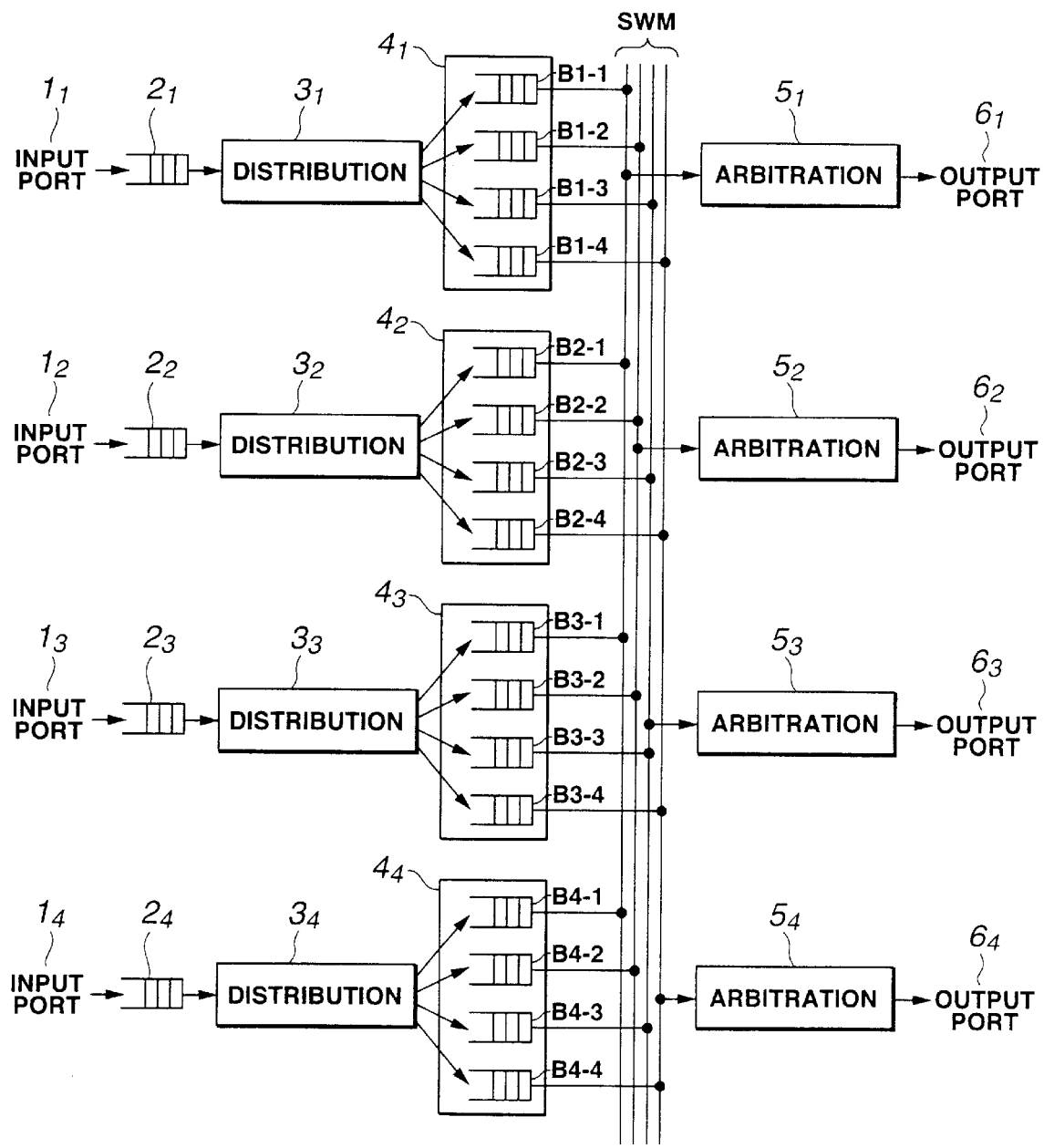
FIG. 1 shows a structure of an ATM cell switching apparatus embodying the present invention.

Referring to the drawings, preferred embodiments of according to the present invention will be explained in detail.

The present embodiment is directed to an ATM cell switching apparatus in which frame data from plural hard disc drives (HDDs), having e.g., MPEG data recorded thereon, to input ports thereof in an asynchronous transfer mode (ATM) in terms of a pre-set number of frames as a unit to output ports thereof. The ATM switching apparatus is usually denoted as an ATM cell switching apparatus.

The ATM cell switching apparatus has four input ports $1_1$, $1_2$, $1_3$ and $1_4$ and four output ports $6_1$, $6_2$, $6_3$ and $6_4$, as shown in FIG. 1. In reality, the number of the input and output ports may be less than 4 or more than 4.

The ATM cell switching apparatus, shown in FIG. 1, is roughly made up of five component portions, namely input buffers $2_1$, $2_2$, $2_3$ and $2_4$ for storing cell data $C_n$ arriving at the input ports $1_1$, $1_2$, $1_3$ and $1_4$ from outside, distribution circuits $3_1$, $3_2$, $3_3$ and $3_4$ for distributing the cell data outputted from the input buffers $2_1$, $2_2$, $2_3$ and $2_4$ to other outlets as the addresses thereof are checked, small capacity memories $4_1$, $4_2$, $4_3$, $4_4$ connecting to outlets of the distribution circuits $3_1$, $3_2$, $3_3$ and $3_4$, a switching matrix SWM interconnecting the small capacity memories $4_1$, $4_2$, $4_3$, $4_4$ to the output ports $6_1$, $6_2$, $6_3$ and $6_4$, and an arbitration circuit $5_1$, $5_2$, $5_3$ and $5_4$ for controlling the switching matrix SWM.

The input buffer $2n$ is able to store 32 of 53 byte cells.

The small capacity memories $4_1$, $4_2$, $4_3$, $4_4$ each include a number of small capacity memories equal to the number of the output ports. For example, the small capacity memory $4_1$ includes four small capacity memories B1-1, B1-2, B1-3 and B1-4, whilst the small capacity memory $4_2$ includes four small capacity memories B2-1, B2-2, B2-3 and B2-4. The small capacity memory $4_3$ includes four small capacity memories B3-1, B3-2, B3-3 and B3-4, whilst the small capacity memory $4_4$ includes four small capacity memories B4-1, B4-2, B4-3 and B4-4. A small capacity memory Bn-n is split into five and stores five cells.

Each of the distribution circuits $3_1$, $3_2$, $3_3$ and $3_4$ checks an address from the ATM header of the ATM cell data to distribute the data to a sole small capacity memory Bn-n of the set of small capacity memories $4n$ associated with the four output ports.

Figure 2:
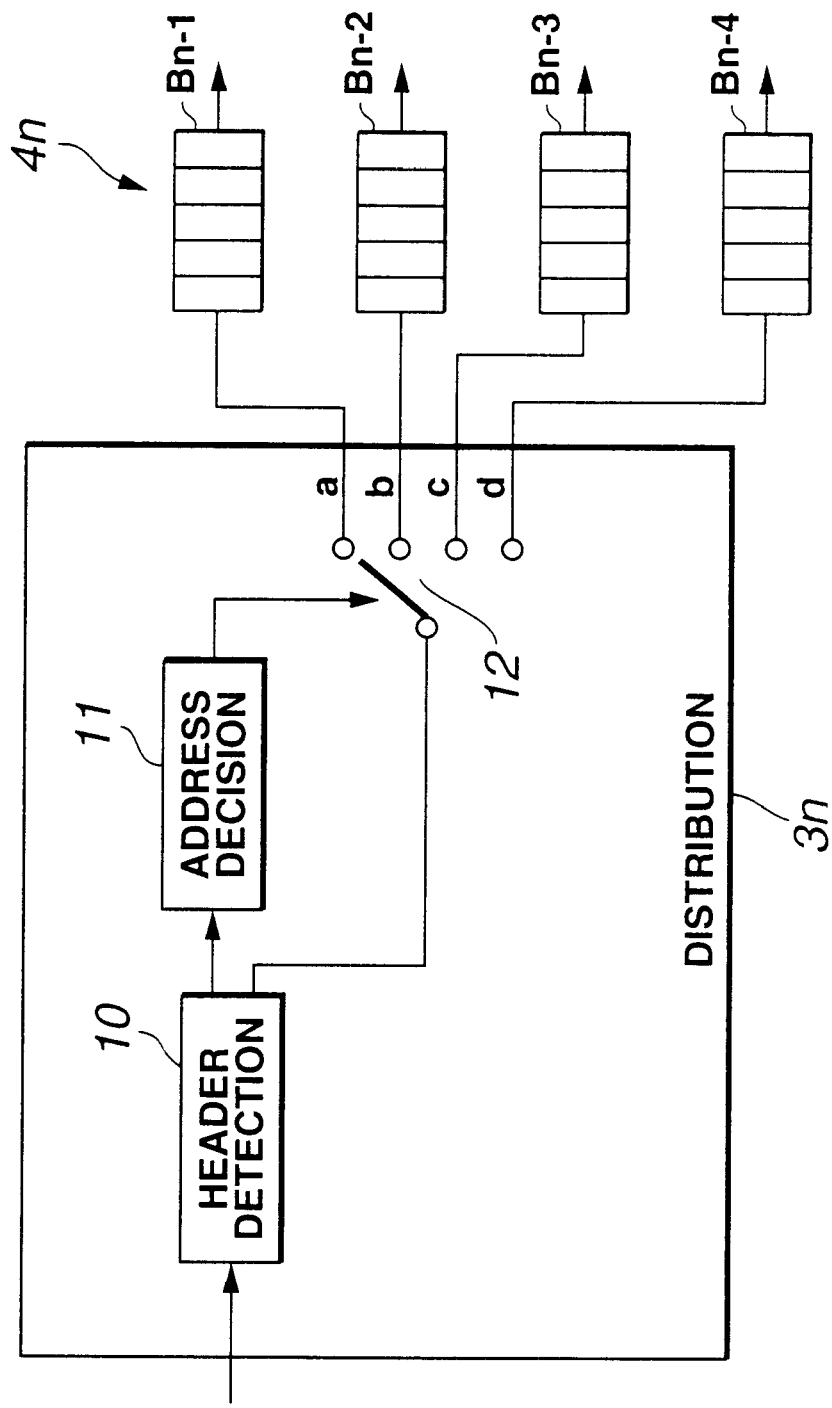
FIG. 2 shows a specified example of a distribution circuit in the ATM cell switching apparatus shown in FIG. 1.

FIG. 2 shows a detailed structure. A header detection unit 10 detects an ATM header of the ATM cell data. The ATM header, detected by the header detection unit 10, is sent to an address verifying unit 11. The address verifying unit 11 deciphers an address of the ATM header. The address is made up of a pre-set number of bits. A changeover switch 12 is set to one of one of four fixed terminals a to d to send the ATM cell data to a small capacity memory Bn-n of the set of the small capacity memories $4n$.

To the ATM header are allocated five bytes, as shown in FIG. 5a. Looking from the leading end, 4 bits are allocated to a generic flow control GFC, 8 bits are allocated to a virtual bus identifier VPI, 16 bits are allocated to a virtual channel identifier VCI, 3 bits are allocates to a payload type PT, 1 bit is allocated to a cell loss priority CLP and 8 bits are allocated to a header error control HEC.

The GFC is used for accessing control in shared media, whilst the VPI and the VCI are used as identifiers for a virtual bus and a virtual channel, respectively. The PT, CLP and the HEC are used as the control information irrelevant to the switching function in the present invention.

Usually, a sum total of 24 bits of the VPI and the VCI are used as address. However, professional users sometimes use these 24 bits plus four bits of the GFC, totalling 28 bits, as address.

Figure 3:
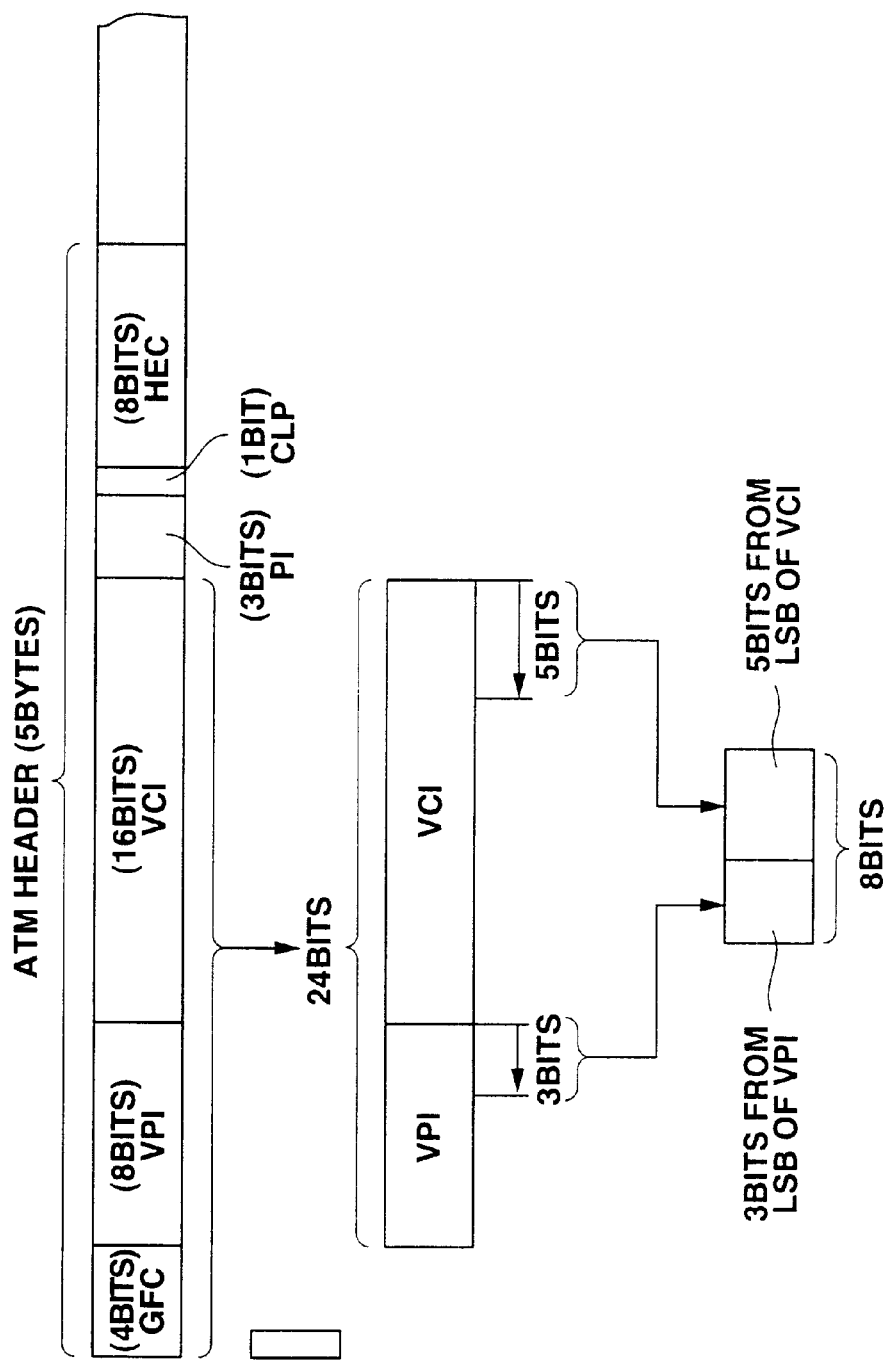
FIG. 3 shows the format of an ATM header detected by the distribution circuit.

In reality, an address is generated from three bits as counted from the LSB of the VPI and five bits as counted from the LSB of the VCI, as shown in FIG. 3c. This address is checked at the address verifying unit 11.

The switching matrix SWM is implemented by providing a sole bus per output port. Therefore, the number of buses is equal to the number of output ports (=4). These buses are controlled by the arbitration circuit $5_1$, $5_2$, $5_3$ and $5_4$ belonging to the output ports $6_1$, $6_2$, $6_3$ and $6_4$ connecting to the respective buses.

The contents controlled by the arbitration circuits $5_1$, $5_2$, $5_3$ and $5_4$ reside in arbitration of the rights for the cells Cn sent from the plural input ports $1_1$, $1_2$, $1_3$ and $1_4$ through the small capacity memories $41$ $4_2$, $4_3$, $4_4$.

Figure 4:
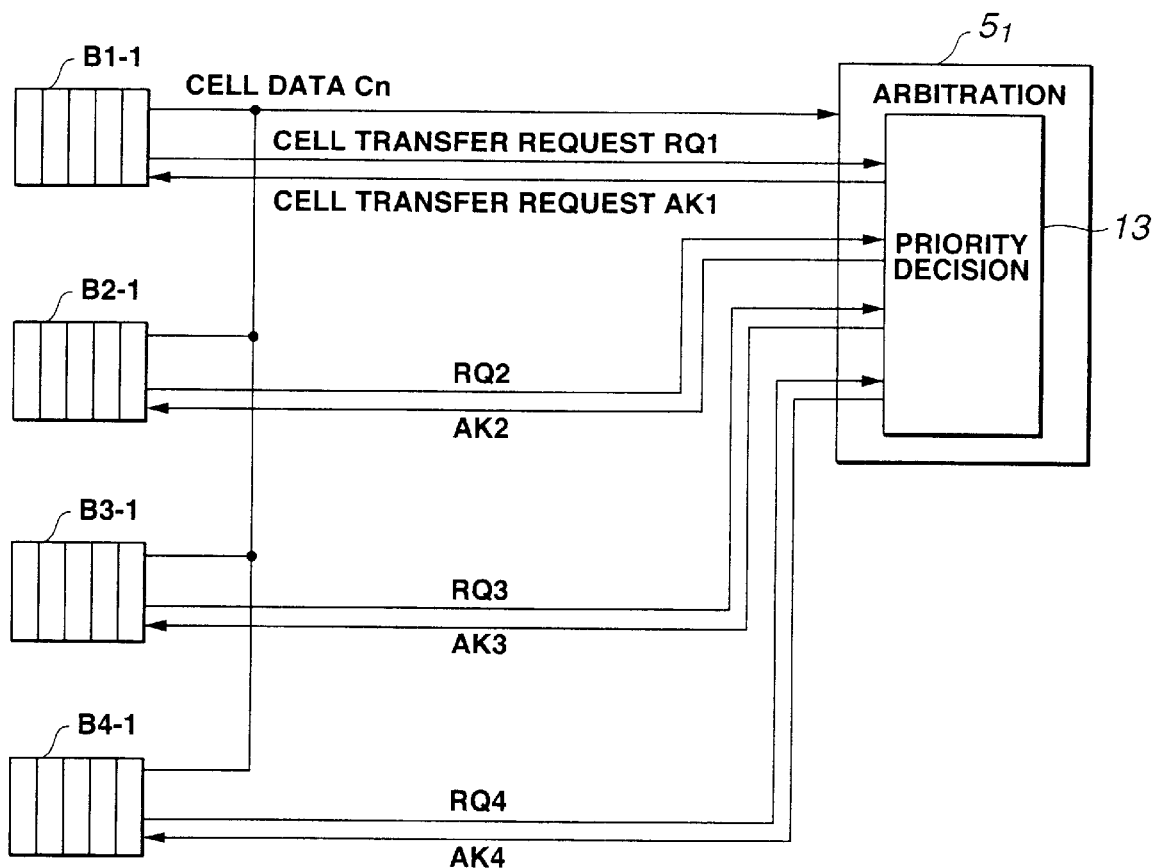
FIG. 4 illustrates the operation of an arbitration circuit in the ATM cell switching apparatus.

The internal structure of the arbitration circuit $5_1$, is shown in FIG. 4. To this arbitration circuit $5_1$, data buses from the small capacity memories B1-1, B2-1, B3-1 and B4-1 are coupled through the switching matrix SWM. These small capacity memories B1-1, B2-1, B3-1 and B4-1 are uppermost small capacity memories of the four small capacity memories $4_1$, $4_2$, $4_3$, $4_4$. Between the small capacity memories B1-1, B2-1, B3-1 and B4-1 and the arbitration circuit $5_1$ are connected signal lines for cell transfer request RQ# sent from the small capacity memories B1-1, B2-1, B3-1 and B4-1 to the arbitration circuit $5_1$ and signal lines for cell transfer permission AK# sent from the arbitration circuit $5_1$ to the small capacity memories B1-1, B2-1, B3-1 and B4-1. On reception of the above two requests in a competitive state from plural, e.g., two small capacity memories, the arbitration circuit $5_1$ selects one of them by any suitable selection means. If, for example, a signal denoting priority is contained in the transfer request#, a priority verification unit 13 is used to verify the priority to select the transfer request having a higher priority. The arbitration circuit $5_1$ returns a cell transfer permission AK# to the small capacity memory Bn-n which has made the transfer request with the higher priority.

The typical operation is explained with reference to FIGS. 5 to 10.

Figure 5:
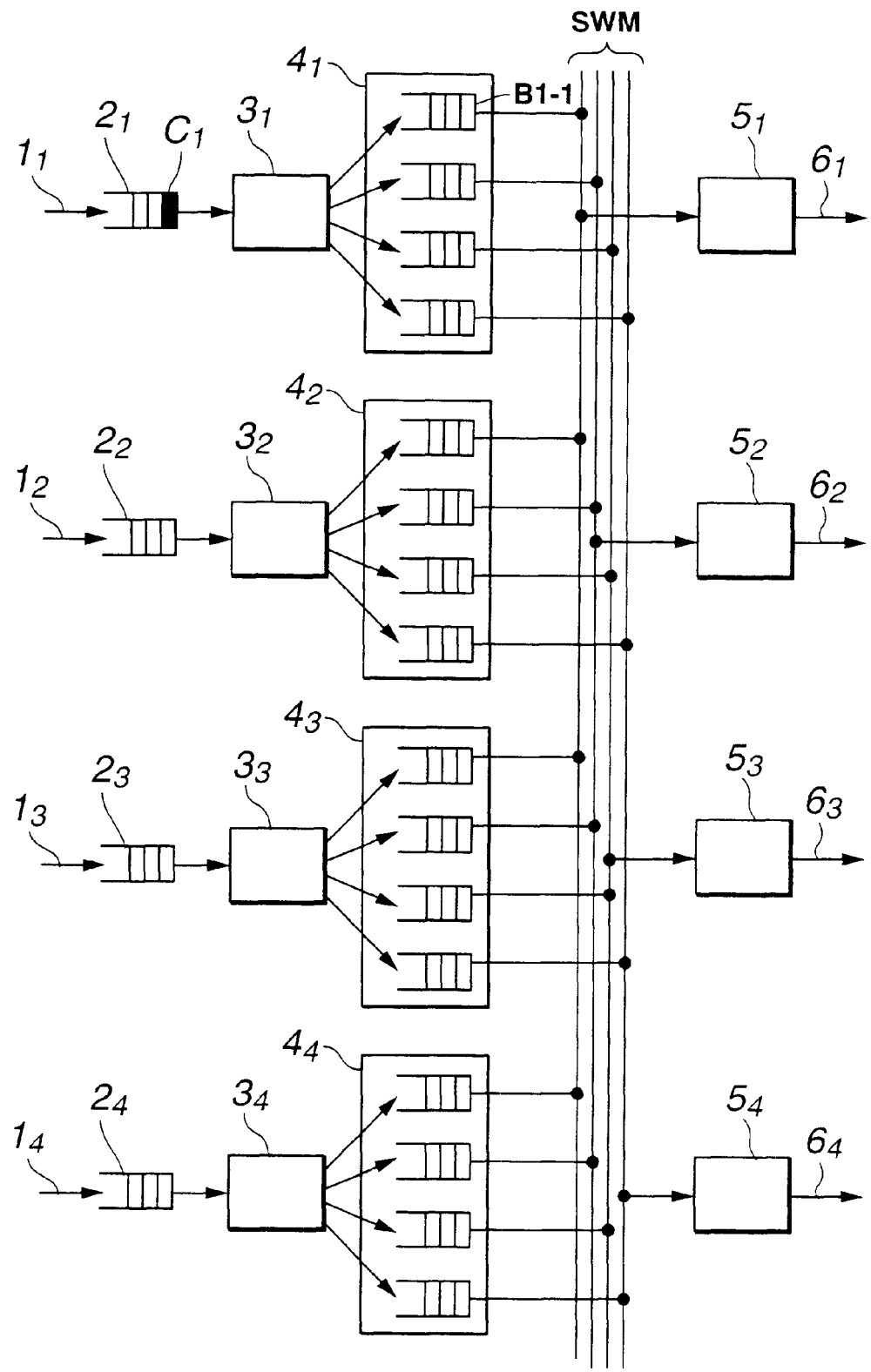
FIG. 5 shows how a cell enters the input port by way of a typical operation of the ATM cell switching apparatus.
Figure 6:
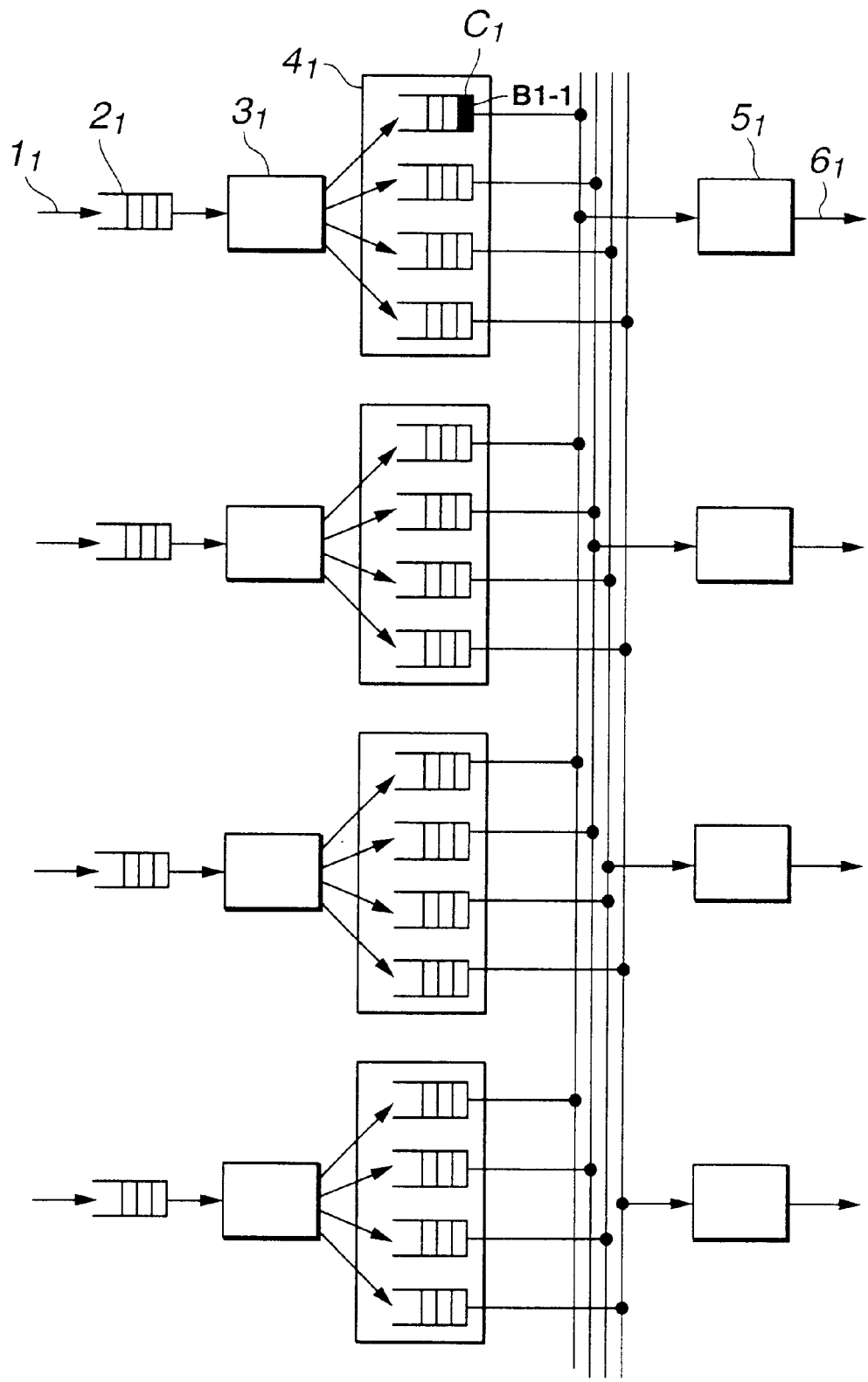
FIG. 6 shows how a cell is outputted from the input buffer and the destination output port is determined by the distribution circuit, by way of a typical operation of the ATM cell switching apparatus.

First, a cell $C_1$ enters the input port $1_1$, as shown in FIG. 5. The cell C1 is stored in the input buffer $2_1$, of the input port $1_1$.

This cell $C_1$ then is outputted from the input buffer $2_1$. The distribution circuit $3_1$ determines an output port which is to be an address, here the output port $6_1$. Correspondingly, the cell $C_1$ is stored in an appropriate one of the small capacity buffers, here the small capacity buffer B1-1 for the cell $C_1$ bound for the output port $6_1$ which has entered the input port $1_1$.

Figure 7:
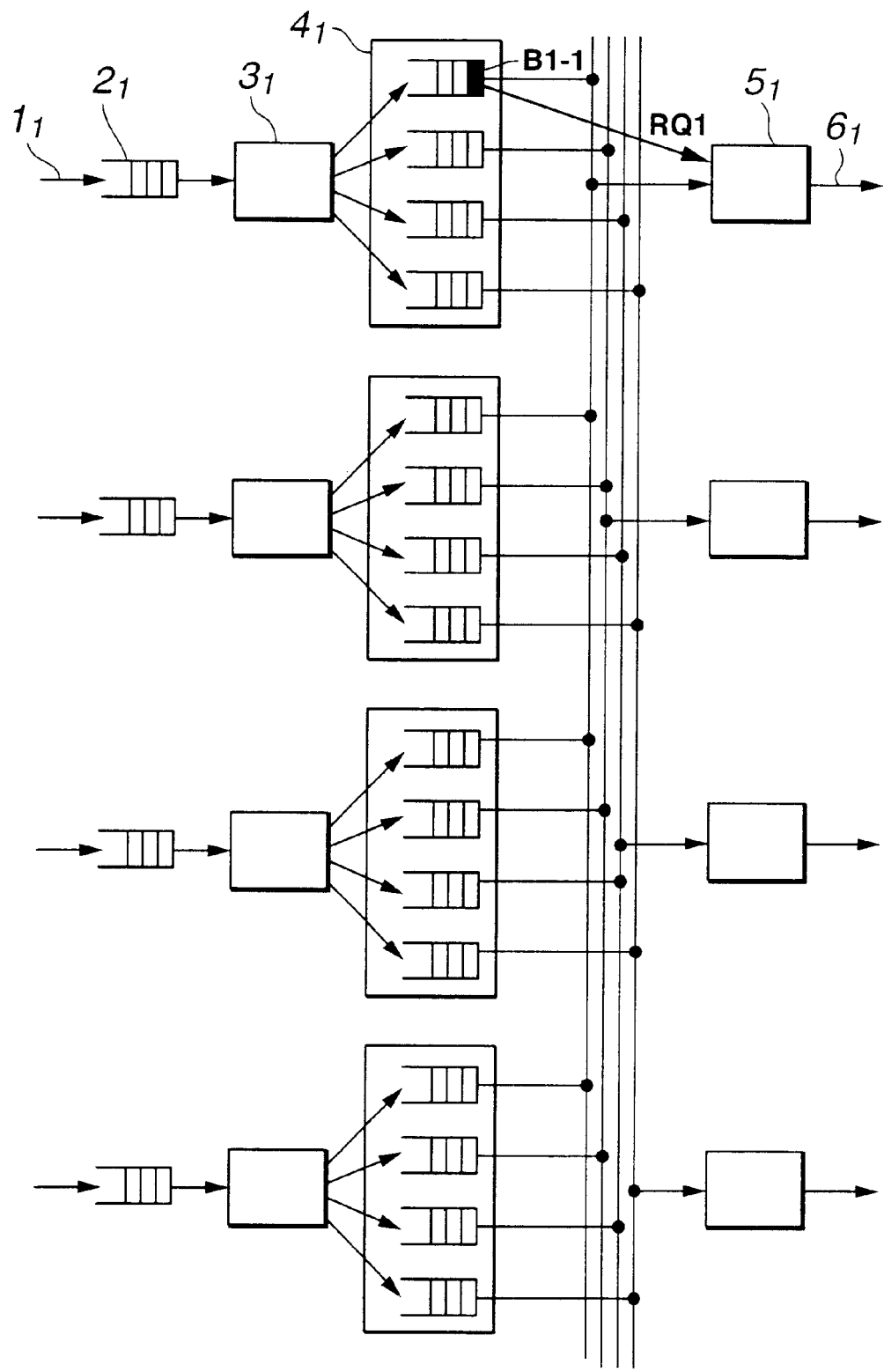
FIG. 7 shows how a cell enters a small capacity buffer and how the small capacity buffer sends a cell transfer request RQ1 to the arbitration circuit, by way of a typical operation of the ATM cell switching apparatus.

If then the cell $C_1$ enters the small capacity buffer B1-1, this small capacity buffer B1-1 sends a cell transfer request RQ1 to the arbitration circuit, here the arbitration circuit $5_1$ of the output port $6_1$, as shown in FIG. 7.

Figure 8:
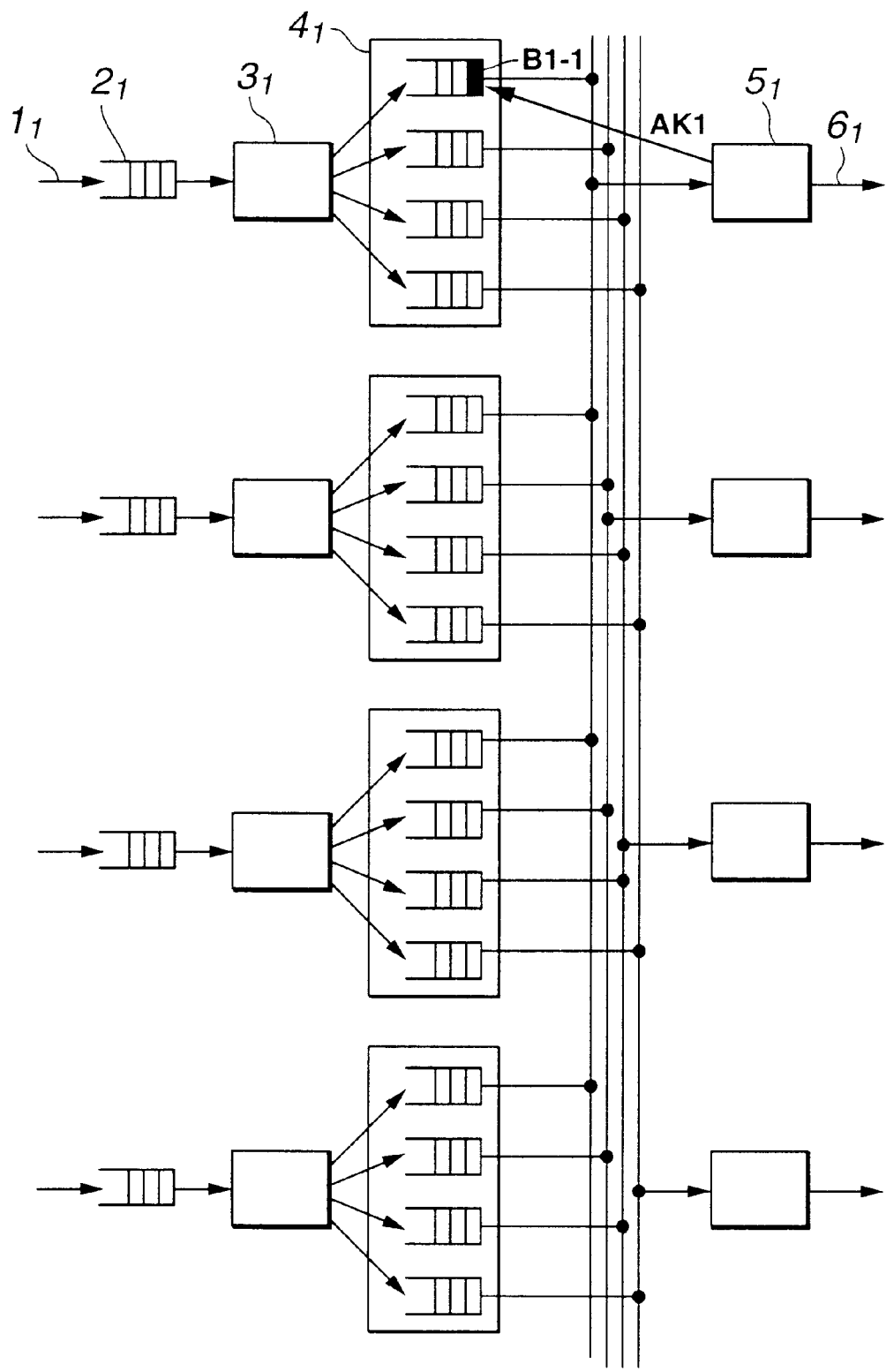
FIG. 8 shows how the arbitration circuit returns the permission of cell transfer to the small capacity buffer, by way of a typical operation of the ATM cell switching apparatus.

The arbitration circuit $5_1$ then returns the cell transfer permission to the small capacity buffer B1-1, as shown in FIG. 8.

Figure 9:
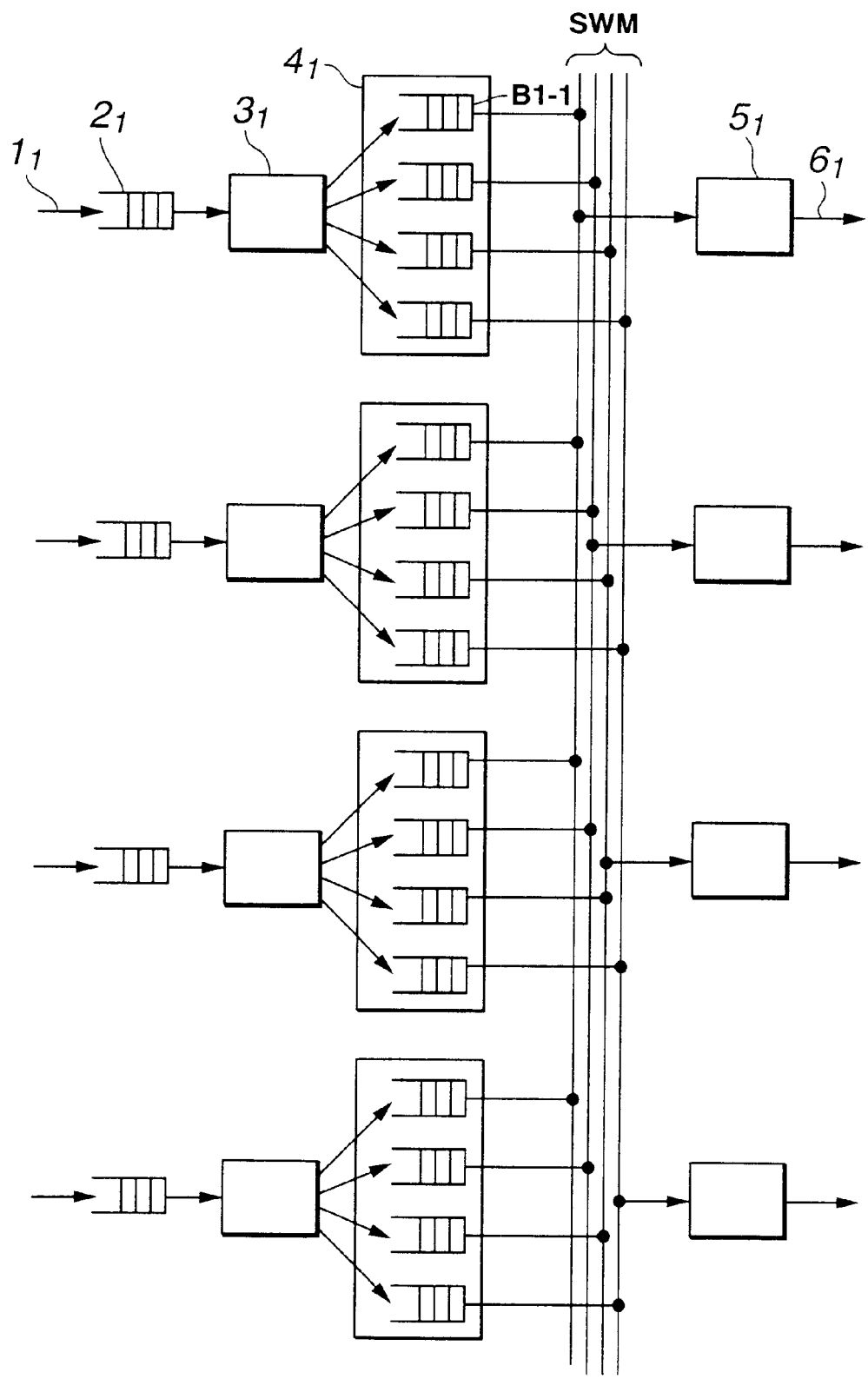
FIG. 9 shows how the small capacity buffer sends a cell to the output port through a switching matrix to halt the cell transfer request.
Figure 10:
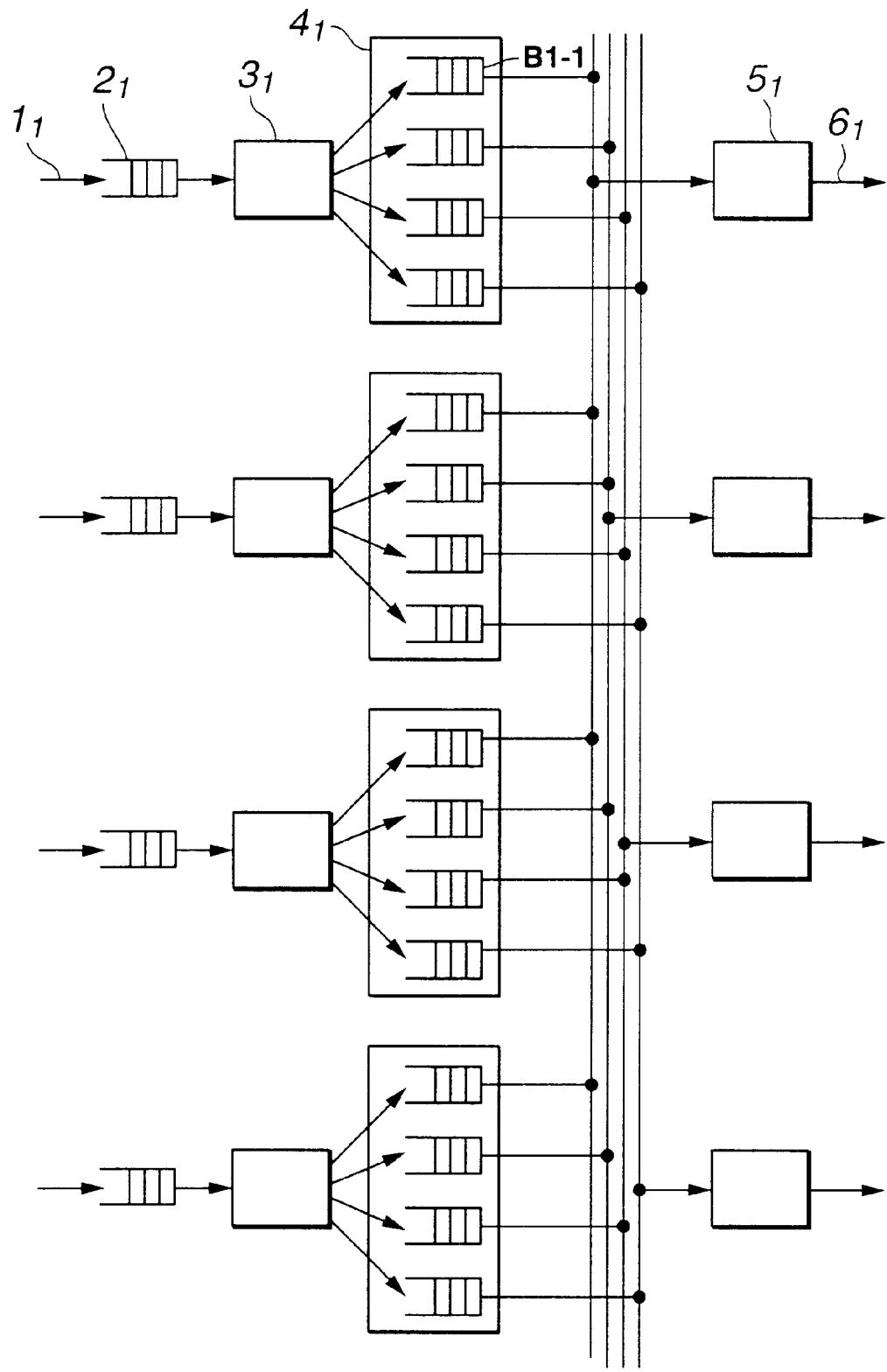
FIG. 10 shows bow a cell is outputted from the output port, by way of a typical operation of the ATM cell switching apparatus.

The small capacity buffer B1-1 then sends the cell $C_1$ through the switching matrix SWM to the output port $6_1$, to halt the cell transfer request RQ1, as shown in FIG. 9. The cell $C_1$ then is outputted at the output port $6_1$, as shown in FIG. 10.

The operation in case two small capacity buffers send a cell transfer request to the same output port in a competitive fashion is explained by referring to FIGS. 11 to 17.

Figure 11:
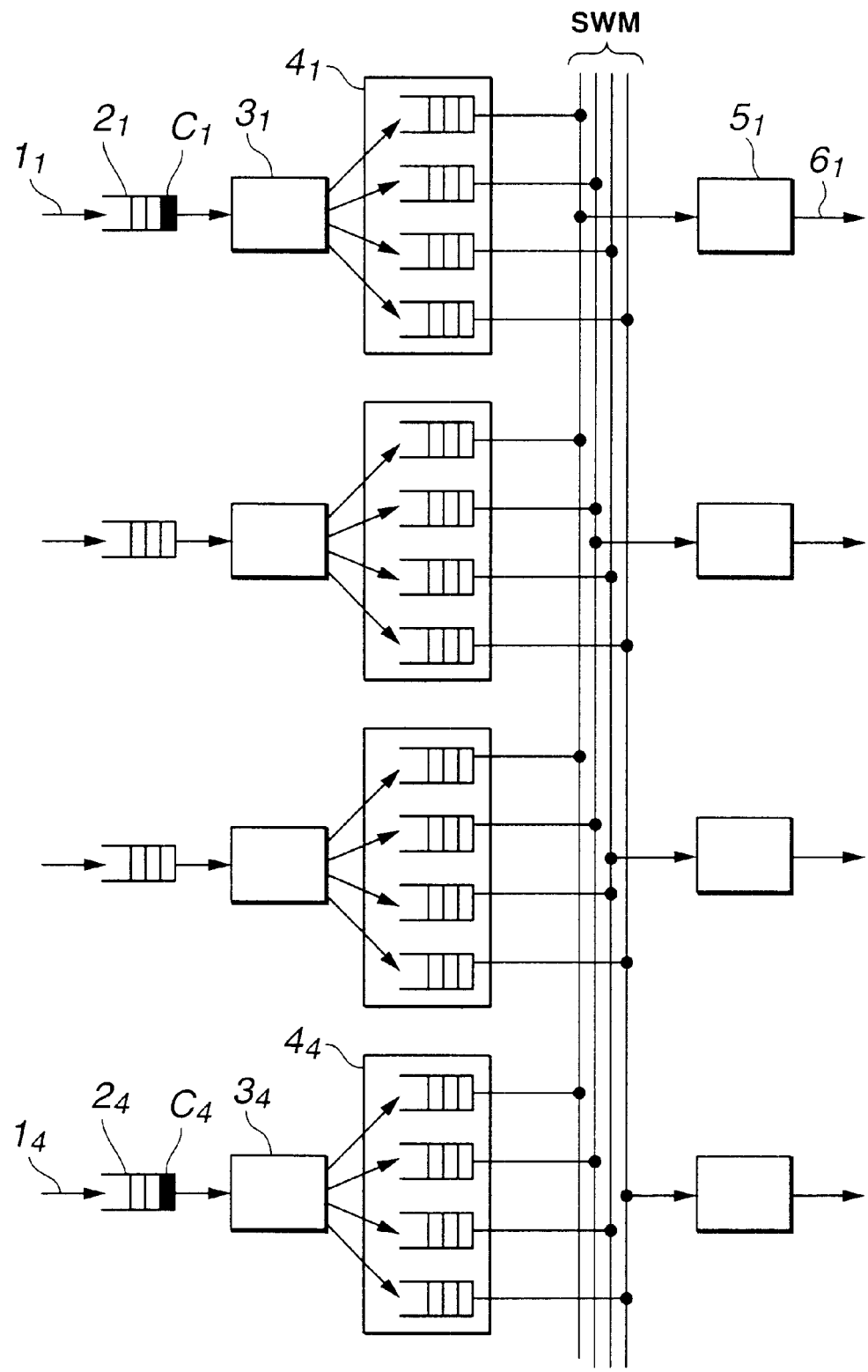
FIG. 11 shows how cells enter two input ports as the competing state operation in which two small capacity buffers in the ATM cell switching apparatus competitively send a cell transfer request to the same output port.

First, the cell $C_1$ enters the input port $1_1$ as shown in FIG. 11. This cell $C_1$ is stored in the input buffer $2_1$ of the input port $1_1$. Simultaneously, a cell $C_4$ enters the input port $1_4$, and stored in the input buffer $2_4$ of the input port $1_4$.

Figure 12:
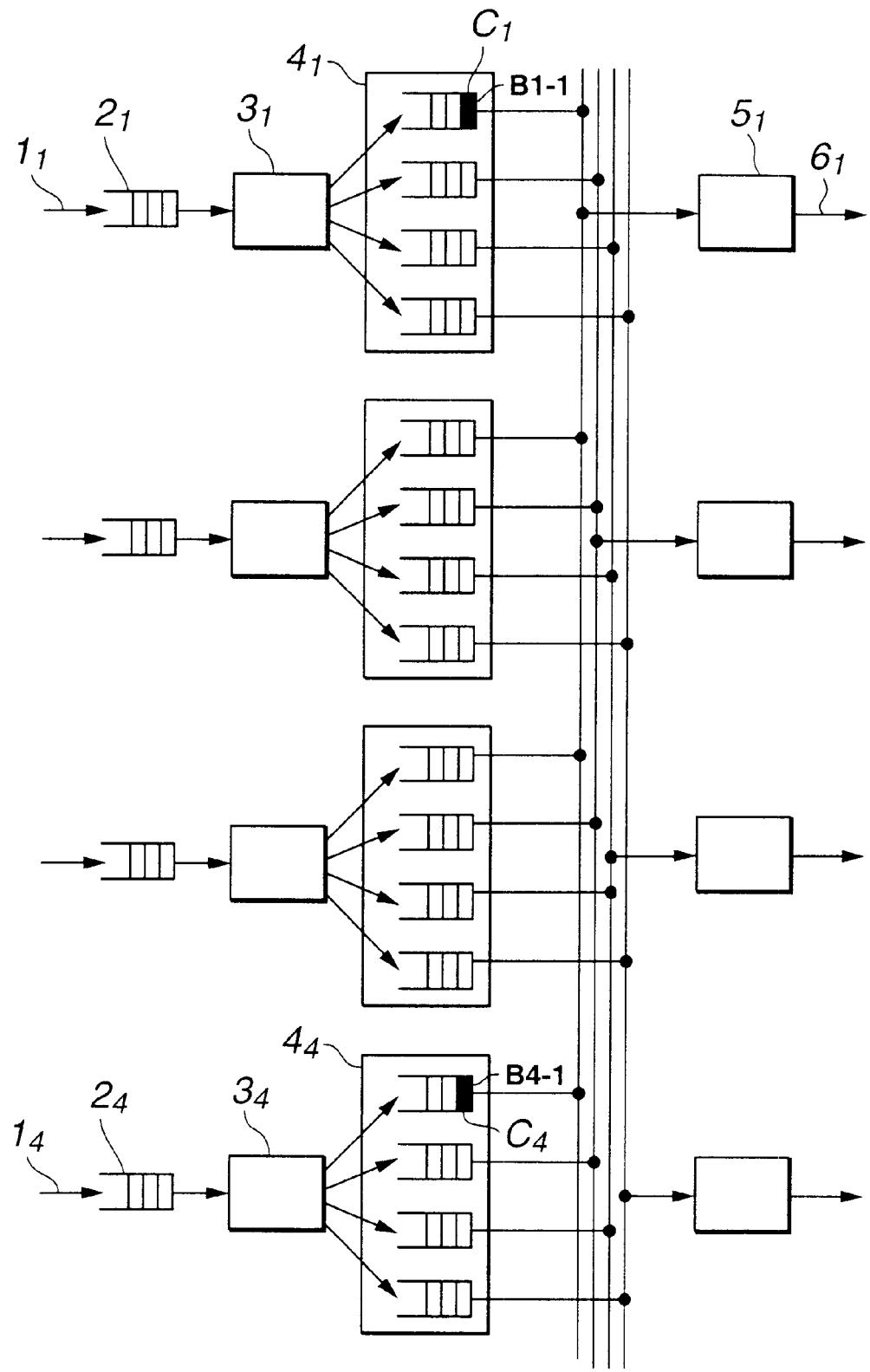
FIG. 12 shows how cells are stored in two small capacity buffers by each distribution circuit in the competitive state of FIG. 11.

The cell $C_1$ is stored by the distribution circuit $3_1$ in the small capacity buffer B1-1, as shown in FIG. 12. Simultaneously, the cell $C_4$ is stored in the small capacity buffer B4-1 by the distribution circuit $3_4$.

Figure 13:
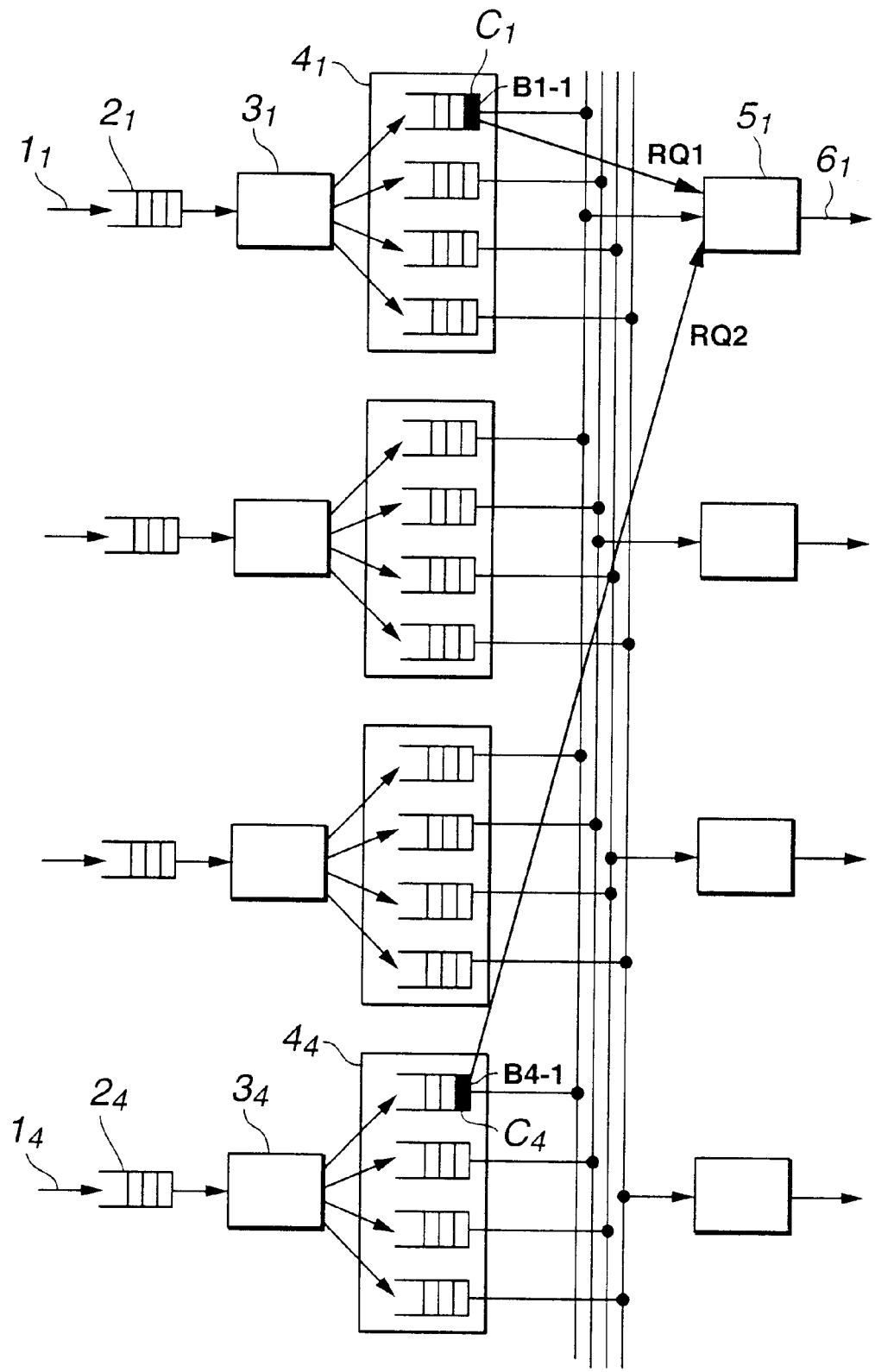
FIG. 13 shows the manner in which two small capacity buffers send a cell transfer request to the arbitration circuit in the competitive state of FIG. 11.

The small capacity buffer B1-1 then sends the cell transfer request RQ1 to the arbitration circuit $5_1$, as shown in FIG. 13. Simultaneously, the small capacity buffer B4-1 sends a cell transfer request RQ4 to the arbitration circuit $5_1$.

Figure 14:
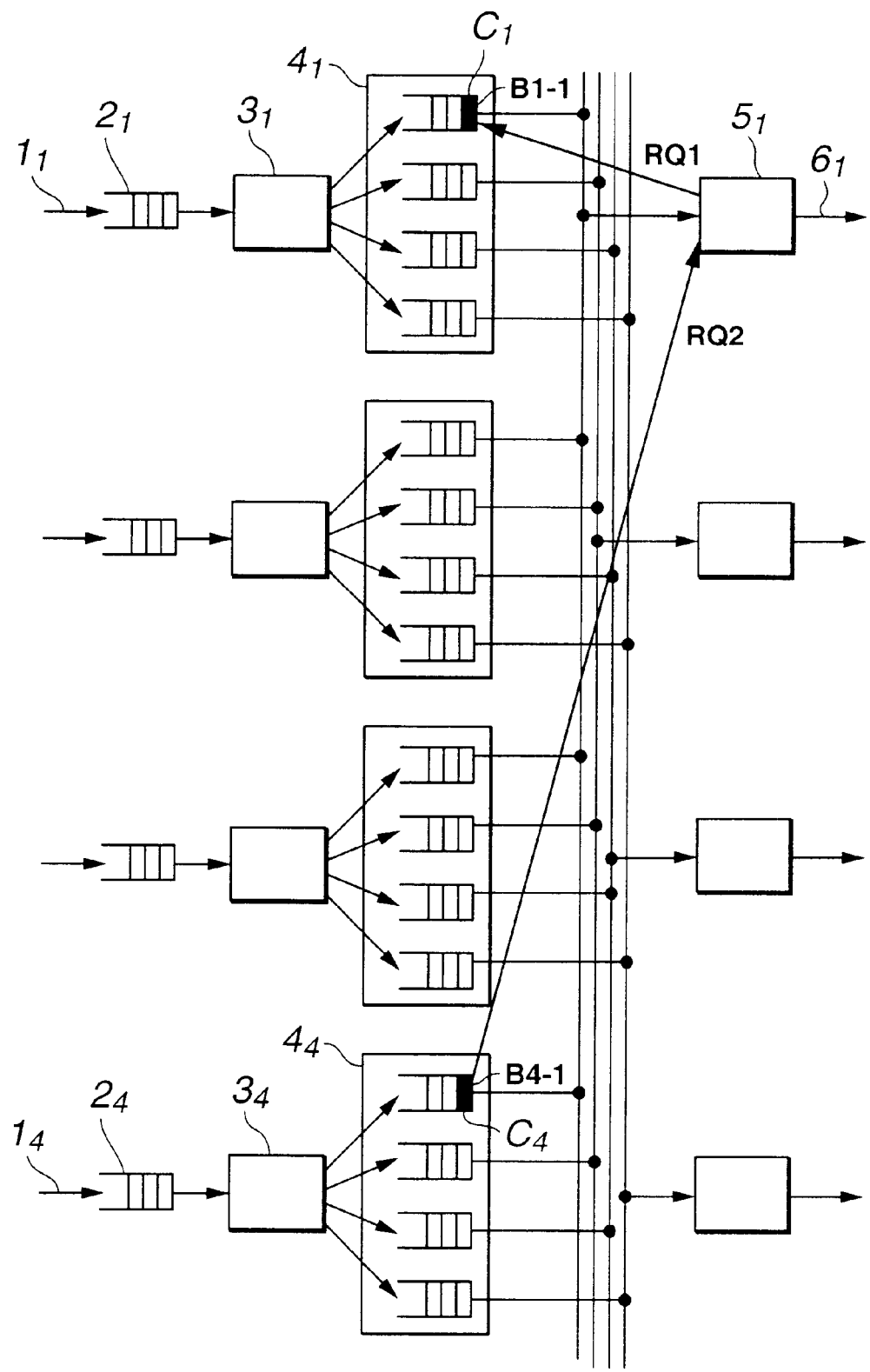
FIG. 14 shows a state in which the arbitration circuit selects one of the two cell transfer requests to return a cell transfer permission to one of the small capacity buffers in the competitive state of FIG. 11.
Figure 15:
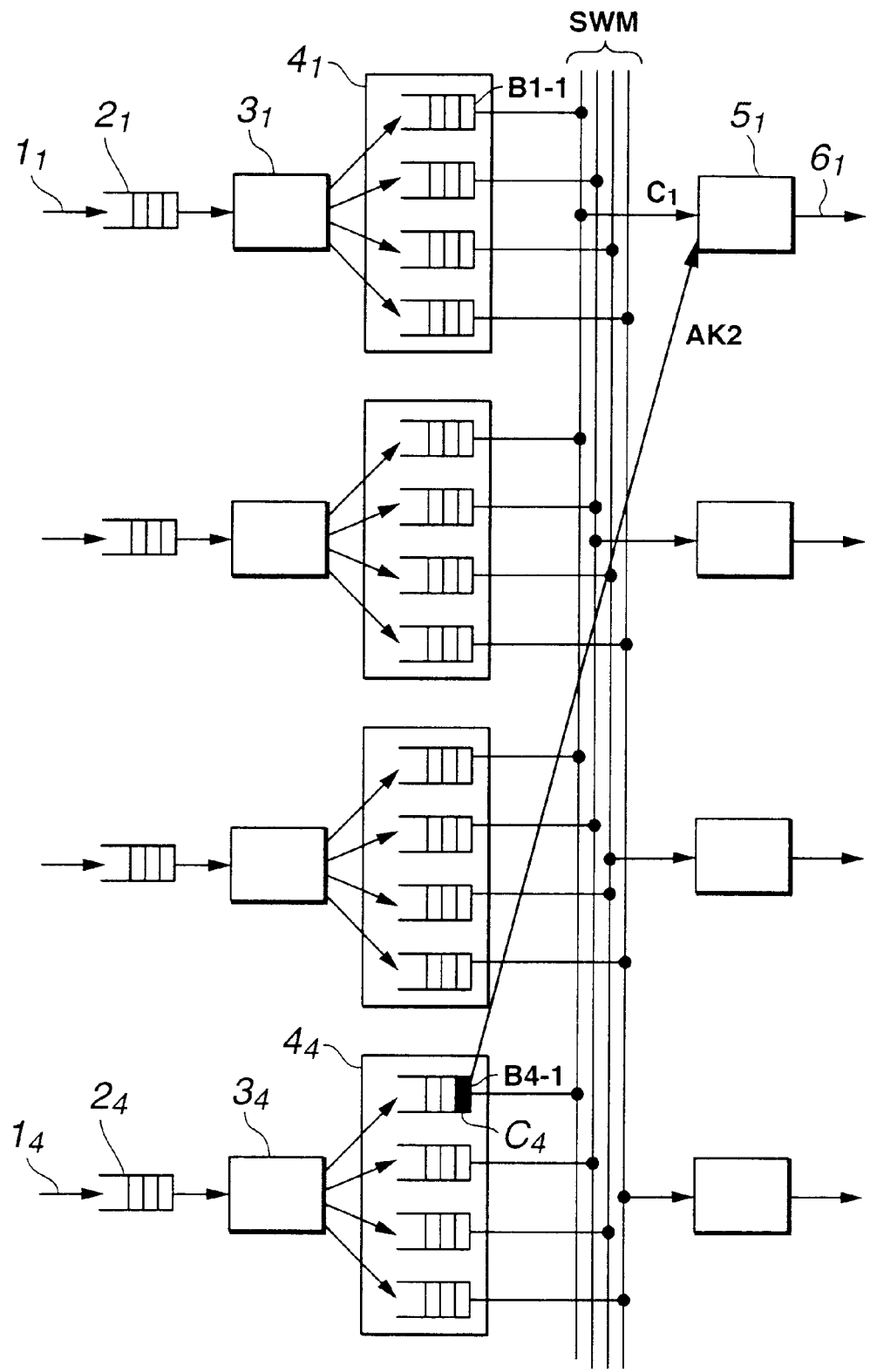
FIG. 15 shows the state in which, in the competitive state of FIG. 11, the small capacity buffer which has received the cell transfer permission sends the cell to the output port, the arbitration circuit accepts the cell transfer request from the other small capacity buffer to return the cell transfer permission to the other small capacity buffer in the competitive state of FIG. 11.

The arbitration circuit $5_1$ selects one of them by any suitable selection means, such as the priority verification unit 13 of FIG. 4, as shown in FIG. 14. In this case, the arbitration circuit $5_1$ selects the cell transfer request from the small capacity buffer B1-1. The arbitration circuit $5_1$, returns the cell transfer permission AK1 to the small capacity buffer B1-1.

The small capacity buffer B1-1 then sends the cell $C_l$ to the output port $6_1$, through the switching matrix SWM to halt the cell transfer request RQ1. The arbitration circuit $5_1$ then accepts the cell transfer request RQ4 from the small capacity buffer B4-1 to return the cell transfer permission AK4 to the small capacity buffer B-4.

Figure 16:
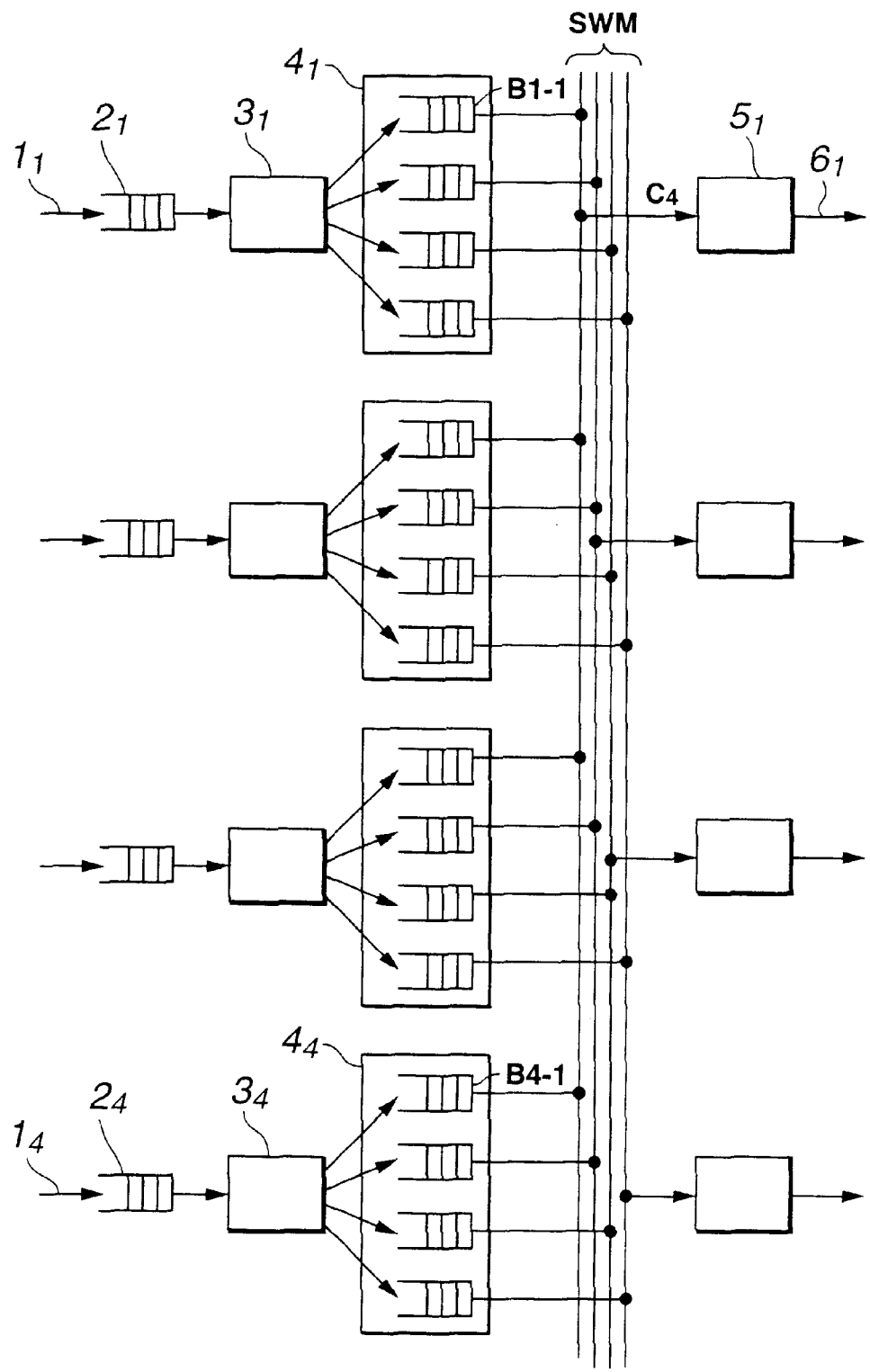
FIG. 16 shows the manner in which a cell exits the output port and simultaneously the other cell exits the output port from the other small capacity buffer in the competitive state of FIG. 11.
Figure 17:
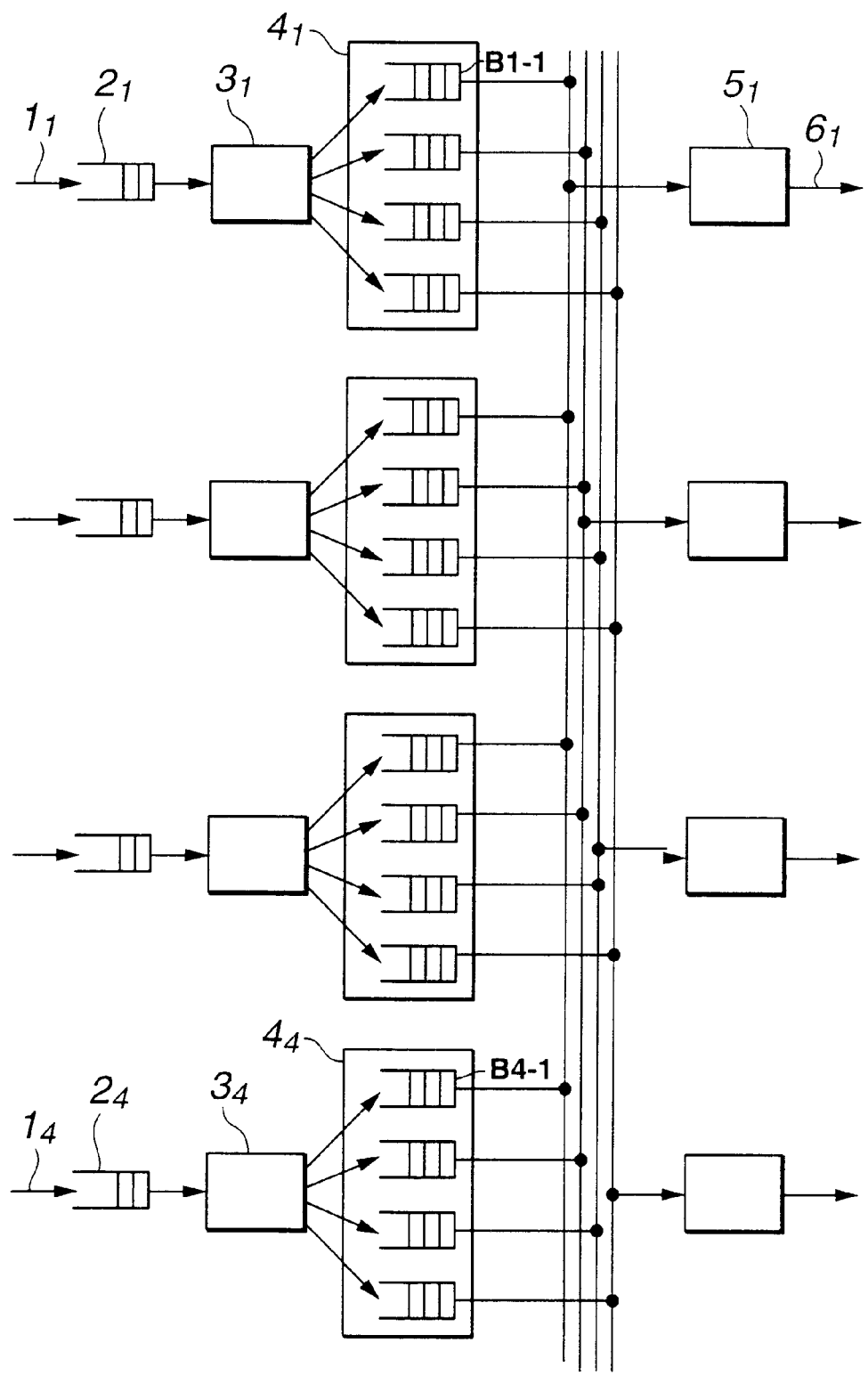
FIG. 17 shows the manner in which the other cell exits the output port.

The cell $C_1$ then exits the output port $6_1$, as shown in FIG. 16. Simultaneously, the small capacity buffer B4-1 sends the cell C4 through the switching matrix SWM to the output port $6_1$ to halt the cell transfer request RQ4. The cell C4 then exits the output port $6_1$, as shown in FIG. 17.

In particular, since the small capacity buffer B1-1 furnishes a temporary storage site for cells, as shown in FIG. 12, so that the distribution circuit 31 is able to accept and process a new cell $C_n$ from the $2_1$. The result is that HOL blocking is not likely to be produced.

Also, since the small capacity buffer transfers a cell to only one output port, it suffices if the switching matrix SWM has a N:1 multiplexer structure. This is far simpler than the complete crossbar structure.

Moreover, it suffices if the small capacity buffer outputs its memory contents to the switching matrix SWM in a FIFO sequence. This sort of the circuit can be implemented as circuit operating at an elevated speed.

With the above-described ATM cell switching apparatus, provided with the small capacity buffer, it is possible to suppress the frequency of occurrence of the HOL blocking phenomenon, which is a defect of the input buffer system capable of suppressing the operating frequency of the internal bus of the ATM cell switching apparatus .

Figure 18:
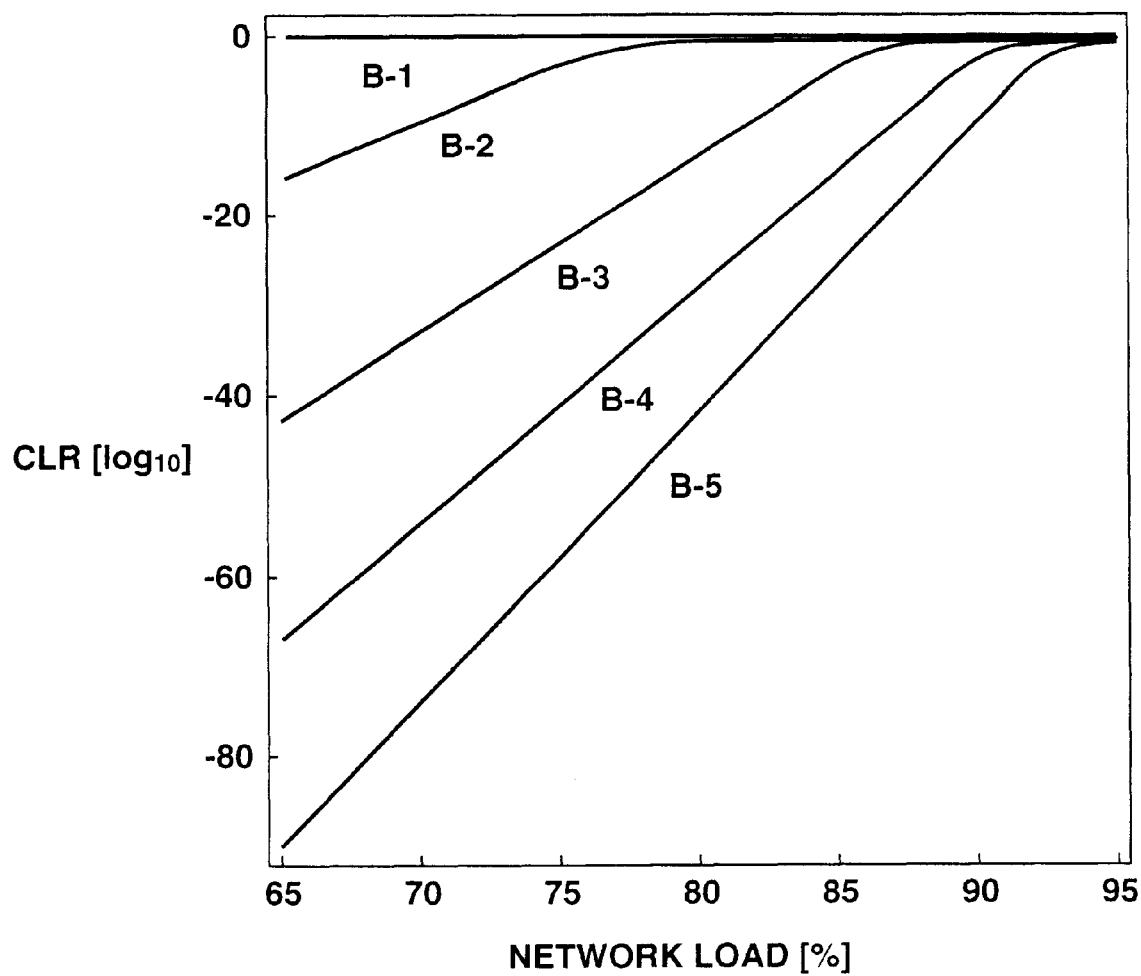
FIG. 18 is a graph showing how the cell loss ratio CLR in the input buffer system is improved in case of using the ATM cell switching apparatus.

FIG. 18 shows how the cell loss ratio CLR of the input buffer system can be improved with the use of the above-described ATM cell switching apparatus.

In FIG. 18, the ordinate denotes the cell loss ratio, that is with which probability the information is lost. The lower the CLR value, the lesser is the lost volume of the information. The abscissa denotes the utilization or the network load and denotes the percentage of the network used, that is the amount of the input.

In more detail, FIG. 18 shows the cell loss ratio in logarithmic representation with 10 as base, for the size of the input buffer being 32 cells, with the information volume entering the input port being changed from 65% to 95%, with the information transmission speed at the output port being 100%. FIG. 18 plots five curves corresponding to the size of the small capacity buffer changing from one cell to five cells. Specifically, looking from an upper position in the graph, these curves denote the sizes of the small capacity buffers B of 1 to 5 in this order. The larger the number B of division of the small capacity buffers, the smaller is the cell loss ratio.

Figure 19:
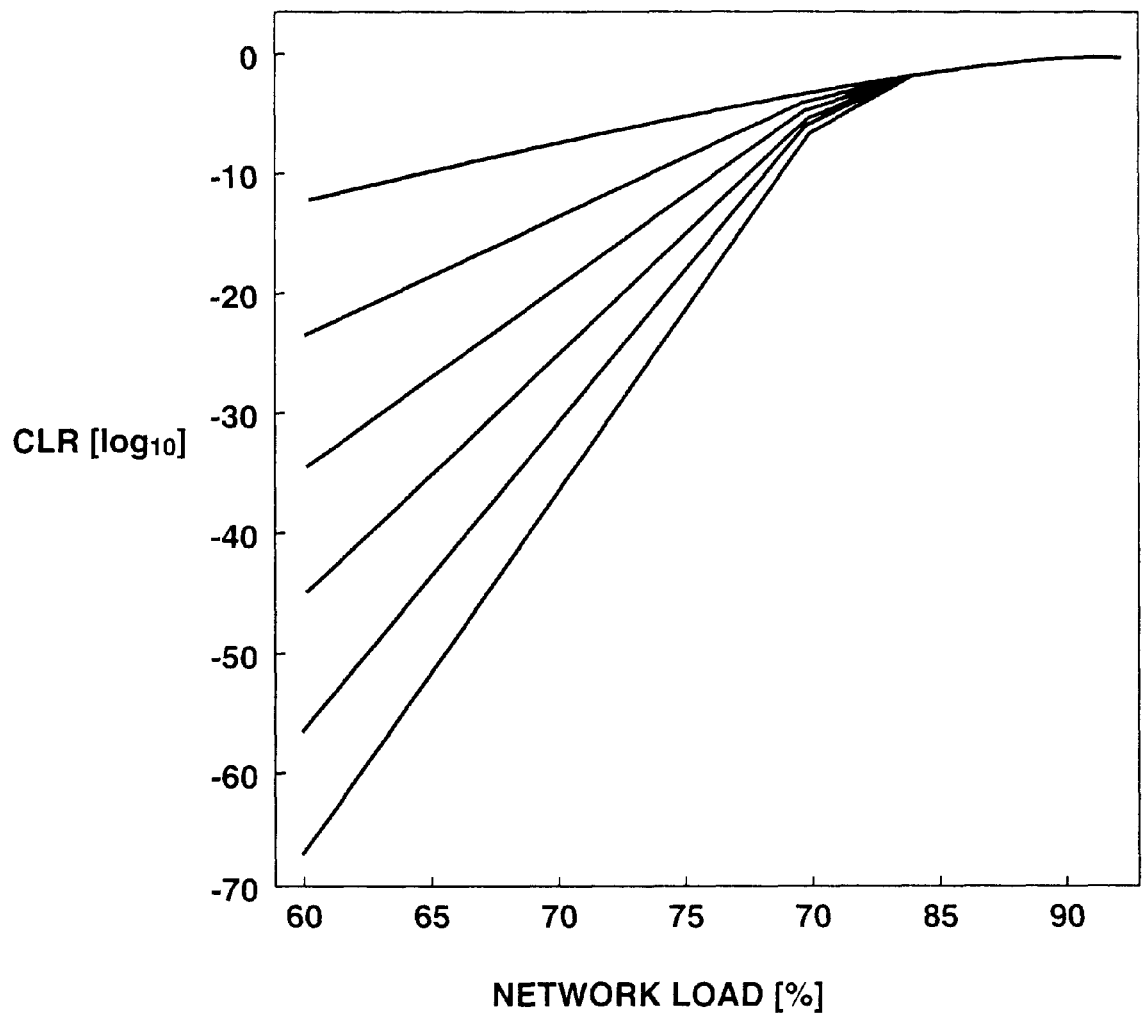
FIG. 19 is a graph for simplified calculation of the cell loss ratio in the input buffer system by way of comparison.
Figure 20:
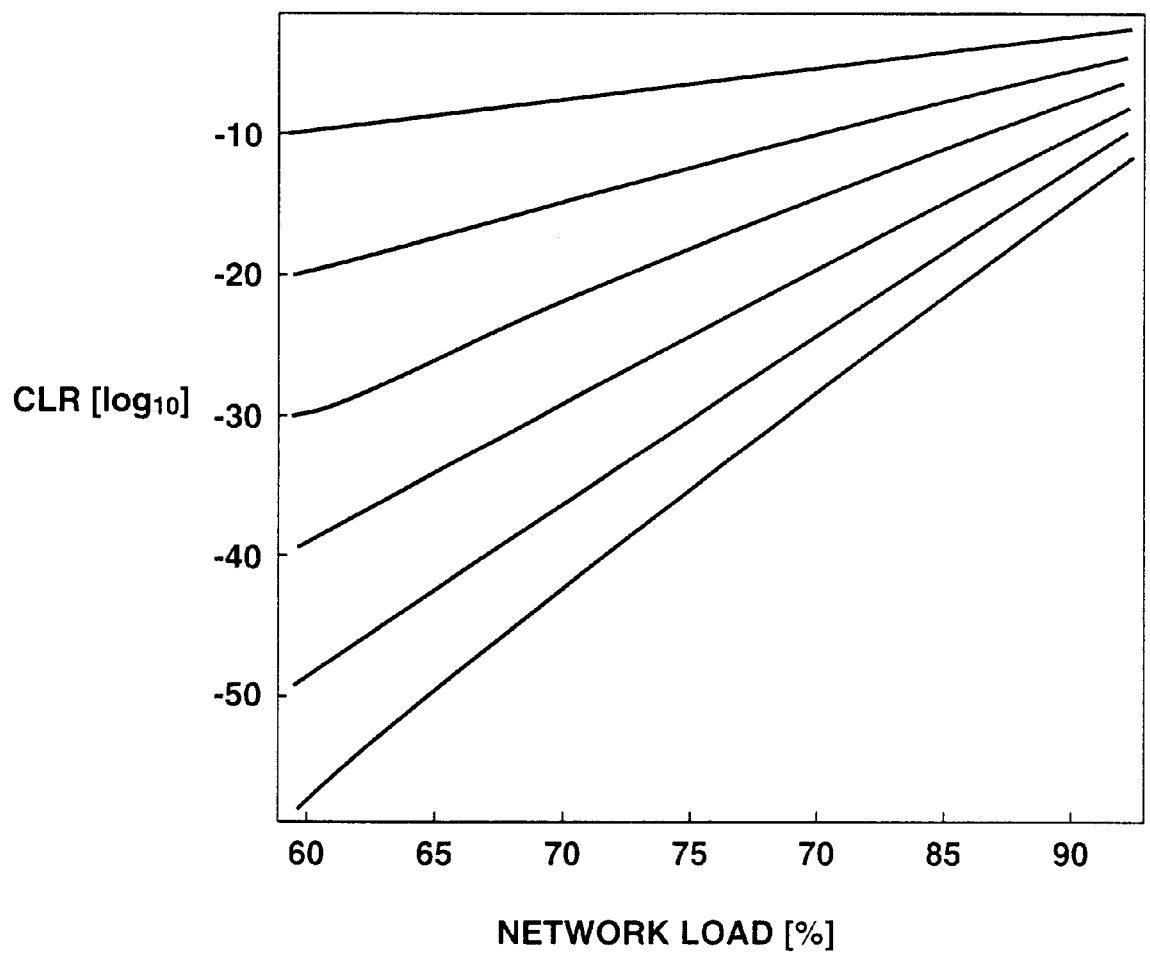
FIG. 20 is a graph for simplified calculation of the cell loss ratio in the output buffer system by way of comparison.

For comparison, FIG. 19 shows a graph for simplified calculation of the cell loss ratio in the input buffer system, whilst FIG. 20 shows a graph for simplified calculation of the cell loss ratio in the output buffer system. The number of buffers is increased to 8, 16, 24, 32, 40 and 48.

In FIG. 19, the larger the number of the buffers, the lesser becomes the cell loss ratio. This effect is manifested most significantly in the vicinity of the network load falling below 80%.

It is also seen from FIG. 20 that the larger the number of buffers, the lesser becomes the cell loss ratio. This effect is manifested over the entire network losses.

The ATM cell switching apparatus shown in FIG. 18 exhibits characteristics similar to those of the input buffer system shown in FIG. 19, while exhibiting smooth changes in characteristics in a direction approaching to those of the output buffer system shown in FIG. 20.

Figure 21:
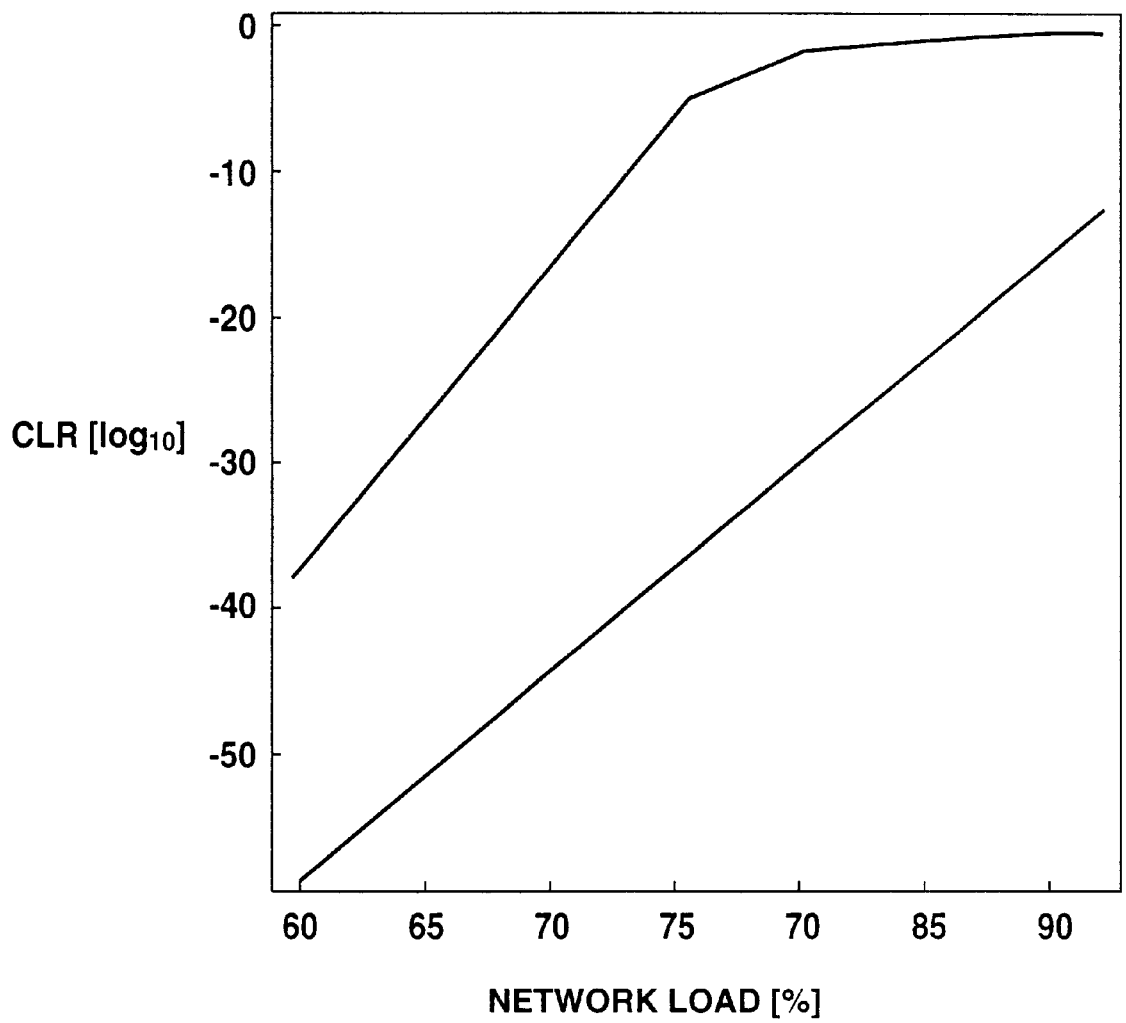
FIG. 21 is a graph for simplified calculation of the cell loss ratios of the output and input buffer systems in case the number of buffers is 48.

FIG. 21 shows the cell loss ratios of the input and output buffer systems for the number of buffers equal to 48. An upper curve represents characteristics of the input buffer system, whilst a lower curve represents those of the output buffer system. It may be seen that the performance of the input buffer system is rapidly degraded for high values of the network loads.

In the ATM cell switching apparatus of the present invention, in which characteristics close to those of the output buffer system may be obtained by providing a sufficient number of stages of small capacity memories, the performance achieved is close to that of the lower graph for the output buffer system.

In the above-described ATM cell switching apparatus, in which cells are stored on the address basis, means for burst transfer or means for lump transfer of plural cells can more effectively be applied. This serves for suppressing the bus operating frequency.

What is claimed is:

1. An apparatus for switching frame data in which data is switched in terms of a pre-set number of frames as a unit, comprising:

input buffer means for storing frame data arriving at an input port from an external data source;

distribution means for checking addresses of the frame data stored in said input buffer means and for distributing the frame data to respective output ports;

memory means connected to a downstream side of said distribution means in association with said output ports for temporarily storing the frame data distributed by said distribution means;

switching means for connecting said memory means to said output ports; and arbitration means for controlling said switching means.

2. The frame data switching apparatus according to claim 1 wherein switching of said frame-based data is performed in an asynchronous transfer mode.

3. The frame data switching apparatus according to claim 1 wherein said memory means issues a transfer request to said arbitration means when said frame data are stored in said memory means.

4. The frame data switching apparatus according to claim 1 wherein said memory means comprises a plurality of memory units and said arbitration means issues a transfer permission depending on a priority when said transfer request is received in a competitive state from said plurality of memory units.

5. A method for switching frame data in which data is switched in terms of a pre-set number of frames as a unit, comprising:

a step of storing frame data arriving at an input port from an external data source in an input buffer;

a step of checking addresses of the frame data stored by said step of storing frame data for associatively distributing the frame data to respective output ports;

a step of temporarily storing in a memory the frame data distributed by said distribution step in association with said output ports;

a step of arbitrating a switching portion between said memory and the output ports in a controlled manner; and a step of transferring the frame data stored in said step of storing frame data to said output ports in response to a use permission of the switching portion arbitrated by said arbitration step.

6. The frame data switching method according to claim 5 further comprising a step of switching the frame-based data is in an asynchronous transfer mode.

* * * * *